US008407141B2

(12) United States Patent
Mullen et al.

(10) Patent No.: US 8,407,141 B2
(45) Date of Patent: Mar. 26, 2013

(54) SYSTEM AND METHOD FOR PROCESSING MULTIPLE METHODS OF PAYMENT

(75) Inventors: Matthew James Mullen, Danville, CA (US); Mark Rockelman, San Mateo, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 23 days.

(21) Appl. No.: 11/929,033

(22) Filed: Oct. 30, 2007

(65) Prior Publication Data

US 2009/0112747 A1  Apr. 30, 2009

(51) Int. Cl.
*G06Q 40/00* (2012.01)
(52) U.S. Cl. ........... 705/39; 705/35; 705/40; 705/59; 705/79; 726/1; 380/201; 455/410; 709/227; 713/161
(58) Field of Classification Search .......... 705/1–45, 705/59, 79; 726/1; 380/201; 455/410; 709/227; 713/161
See application file for complete search history.

(56) References Cited

U.S. PATENT DOCUMENTS

| 6,032,133 | A | * | 2/2000 | Hilt et al. ............... 705/40 |
| 6,292,789 | B1 | | 9/2001 | Schutzer |
| 6,308,887 | B1 | * | 10/2001 | Korman et al. ......... 235/379 |
| 6,408,284 | B1 | * | 6/2002 | Hilt et al. ............... 705/40 |
| 6,611,818 | B1 | | 8/2003 | Mersky et al. |
| 6,996,542 | B1 | | 2/2006 | Landry |
| 7,031,940 | B2 | | 4/2006 | Shigemi et al. |
| 7,792,712 | B2 | | 9/2010 | Kantarjiev et al. |
| 7,792,717 | B1 | | 9/2010 | Hankins et al. |
| 7,930,248 | B1 | | 4/2011 | Lawson et al. |
| 8,074,257 | B2 | * | 12/2011 | Felsted et al. .......... 726/1 |
| 8,099,365 | B2 | * | 1/2012 | Bhambri et al. ........ 705/59 |
| 8,135,383 | B2 | * | 3/2012 | Bickerstaff et al. ..... 455/410 |
| 2002/0111886 | A1 | | 8/2002 | Chenevich et al. |
| 2002/0111915 | A1 | | 8/2002 | Clemens et al. |
| 2002/0111916 | A1 | | 8/2002 | Coronna et al. |
| 2002/0116331 | A1 | | 8/2002 | Cataline et al. |
| 2002/0194138 | A1 | * | 12/2002 | Dominguez et al. ..... 705/64 |
| 2003/0055792 | A1 | * | 3/2003 | Kinoshita et al. ....... 705/67 |
| 2004/0117302 | A1 | | 6/2004 | Weichert et al. |
| 2004/0128240 | A1 | * | 7/2004 | Yusin .................... 705/39 |
| 2004/0143527 | A1 | * | 7/2004 | Benkert et al. .......... 705/35 |
| 2004/0230526 | A1 | | 11/2004 | Praisner |

(Continued)

FOREIGN PATENT DOCUMENTS

WO  WO 2006/124808 A1  11/2006

OTHER PUBLICATIONS

GreenZap Building Payment Gateway to Deliver Instant Transactions, Business Wire, p. NA, Oct. 12, 2005.*

(Continued)

*Primary Examiner* — Tien Nguyen
(74) *Attorney, Agent, or Firm* — Kilpatrick Townsend & Stockton LLP

(57) ABSTRACT

Financial transaction data comprising payment on any one of multiple financial transaction types are processed with an adapter layer that receives an incoming data message relating to a financial transaction initiated by a payer and operates on the incoming data message to produce adapted data relating to the financial transaction, and a processor that receives the adapted data and determines transaction routing to direct the adapted data to a processing network module that requests authorization by an issuer, responds to authorization by initiating request for settlement and payment on the financial transaction to a transaction payee, and responds to payee query requests by providing non-payment data to an external payee.

28 Claims, 10 Drawing Sheets

U.S. PATENT DOCUMENTS

| | | | |
|---|---|---|---|
| 2004/0267648 A1 | 12/2004 | Schaub | |
| 2005/0049974 A1* | 3/2005 | Jani et al. | 705/64 |
| 2005/0096011 A1 | 5/2005 | Yoshida et al. | |
| 2005/0119918 A1 | 6/2005 | Berliner | |
| 2005/0177494 A1 | 8/2005 | Kelly et al. | |
| 2006/0178986 A1 | 8/2006 | Giordano et al. | |
| 2006/0206425 A1* | 9/2006 | Sharma | 705/40 |
| 2007/0016526 A1* | 1/2007 | Hansen et al. | 705/40 |
| 2007/0038560 A1* | 2/2007 | Ansley | 705/39 |
| 2007/0067239 A1 | 3/2007 | Dheer et al. | |
| 2007/0192245 A1* | 8/2007 | Fisher et al. | 705/39 |
| 2007/0198277 A1* | 8/2007 | Philipp et al. | 705/1 |
| 2008/0010204 A1 | 1/2008 | Rackley, III et al. | |
| 2008/0015985 A1 | 1/2008 | Abhari et al. | |
| 2008/0133407 A1 | 6/2008 | Guillory et al. | |
| 2008/0154769 A1 | 6/2008 | Anderson et al. | |
| 2008/0162341 A1 | 7/2008 | Zimmer et al. | |
| 2008/0235101 A1 | 9/2008 | Piepenbrink et al. | |
| 2009/0063353 A1 | 3/2009 | Viidu et al. | |
| 2009/0076953 A1* | 3/2009 | Saville et al. | 705/40 |

OTHER PUBLICATIONS

Payment Data Systems, Inc. Announces Credit Card Gateway Services for Billers and Merchants, PR Newswire, p. NA, Nov. 3, 2003.*

Country Survey—Russia: Russia's payment industry catches up, Electronic Payments International, Dec. 31, 2006.*

Mastercard Advisors, Purchase Logic™, 2 pages.

Notice of Allowance mailed Jun. 26, 2012 in related U.S. Appl. No. 12/030,804, 33 pages.

Notice of Allowance mailed Jun. 27, 2012 in related U.S. Appl. No. 12/030,785, 27 pages.

Notice of Allowance mailed Jul. 18, 2012 in U.S. Appl. No. 12/030,824, 88 pages.

Office Action mailed Apr. 18, 2012 in U.S. Appl. No. 12/030,816, 31 pages.

American Express, S2S eInvoice & Pay, "The automated invoice and payment solution that drives efficiencies and cost savings", EIPSFactSheet-0707, retrieved from internet Feb. 2008, 2 pages, http://corp.americanexpress.com/gcs/s2s/einvoicepay/docs/S2S_eInvoicePay-Factsheet.pdf.

Mastercard Advisors, Purchase Logic™, 2 pages, 2003.

Mastercard Worldwide, Payment Gateway, "When was the last time somebody referred to accounts payable as "A well-oiled machine"?", MPG-Buyer 01; retrieved from internet Feb. 2008, 2 pages, https://www.mastercardpaymentgateway.com/mpgpublic/pdf/buyers_sell_sheet.pdf.

Mastercard Worldwide, Payment Gateway, "There may be no shortcuts to success. But there is one to getting paid.", MPG-Supplier 0-1; retrieved from internet Feb. 2008, 2 pages, https://www.mastercardpaymentgateway.com/mpgpublic/pdf/supplier_sell_sheet.pdf.

* cited by examiner

SYSTEM AND METHOD FOR PROCESSING MULTIPLE METHODS OF PAYMENT

BACKGROUND OF THE INVENTION

Systems for processing credit card charges can provide sophisticated business rules decisioning and account management features. For example, Visa U.S.A. Inc. has extensive expertise in card payment processing features, such as decisioning and risk management assessment, account management, account reconciliation, customer identification, and the like. This expertise is delivered through the proprietary network known as "VisaNet". Data relating to credit card financial transactions is received into the network and processed. The financial transactions data is routinely communicated between such processing networks and business entities, including entities such as product vendors and service providers, issuers, acquirers, and various financial institutions. Thus, the sophisticated charge card data processing expertise and extensive database processing features are readily available from networks such as the "VisaNet" network for processing such transactions.

Such database processing features could be useful in other financial streams for non-card forms of payment and transactions, such as checks, money transfers, online banking, and Web-based bill payment. There are no currently available interfaces that would permit capture of such financial transactions for processing by systems such as the VisaNet network. Thus, a truly global payments hub with the sophisticated processing features now enjoyed by the credit card payment industry is not currently available.

There are existing systems that style themselves as a "global payment hub" for multiple streams of payment, but they cannot provide the full range of processing features enjoyed by card payment processing systems such as VisaNet because (1) such existing systems typically cannot truly accommodate multiple payment streams but are limited to banking, or checks, for funds transfer, but cannot process across all such streams; (2) they do not have a system architecture that permits modular integration of new lines of payment streams as they arise; (3) even if such systems could process multiple streams of incoming payment, they cannot offer the sophisticated database processing features such as offered by Visa-Net for card payment processing, comprising decisioning, risk analysis, account management, and the like.

Thus, existing payment processing systems require relatively complicated customized software solutions that are specially configured for the provider of each individual incoming payment data stream and typically cannot provide the breadth of risk management and account management features and the like that can be provided by sophisticated charge account processing systems such as the VisaNet system. Moreover, integration with existing card payment processing networks can be advantageous for consumers, because of the efficiency and convenience consumers may experience by having a single source for communication about financial transactions.

What is needed is a truly "global payment hub" system that can interface with existing external payment networks to provide proper communication and security across all types of financial transactions, accommodate future payment streams without complicated interface modifications, and provide sophisticated database processing features such as decisioning, risk analysis, account management, and the like. The present invention satisfies these needs.

SUMMARY

In accordance with the invention, financial transaction data comprising multiple payment streams are processed with an adapter layer that receives an incoming data message relating to a financial transaction initiated by a payer and operates on the incoming data message to produce adapted data relating to the financial transaction, and a processor that receives the adapted data and determines transaction routing to direct the adapted data to a processing network module that requests authorization by an issuer, responds to authorization by initiating request for settlement and payment on the financial transaction to a transaction payee, and responds to payee query requests by providing non-payment data to an external payee.

The processing platform described herein (also referred to as "MMOP" for "Multiple Methods of Payment") is a middleware component that lets the VisaNet system interface to multiple streams of payment and financial transaction data. At the back end, the MMOP platform will interface to the Visa-Net system, and at the front end, the MMOP platform will receive financial transaction data from disparate payment streams through interface modules or adapters, thereby enabling the VisaNet system to operate on the disparate financial transaction data. The interface modules permit relatively efficient adaptation of incoming streams of financial transaction data into formats that are required for processing by the VisaNet system.

Other advantages of the present invention will be apparent to one of ordinary skill in the art upon review of the detailed description of the present invention and the included drawing figures.

DETAILED DESCRIPTION

Figure 1:
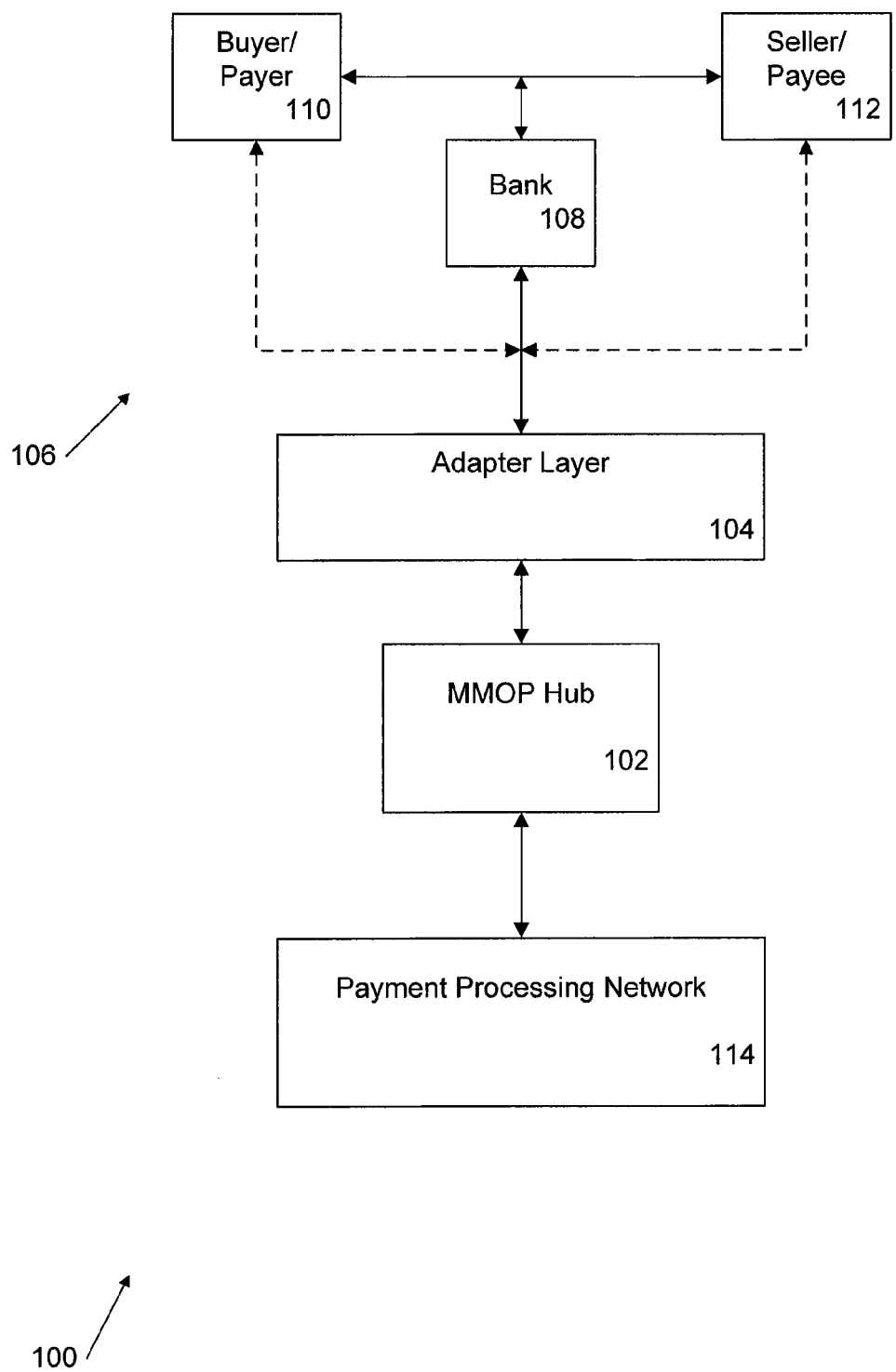
FIG. 1 is a schematic representation of a system constructed in accordance with the present invention.

FIG. 1 shows a system 100 constructed in accordance with the present invention. A data center hub 102 that accommodates multiple methods of payments (identified in FIG. 1 as an MMOP hub) communicates with an adapter layer 104 that communicates with external entities 106 concerning messages relating financial transactions. The external entities typically include banks 108 and similar financial institutions. The banks, in turn, communicate with buyer/payer entities 110 and seller/payee entities 112. The buyers 110 can include, for example, consumers making purchases and companies making payments through credit cards, wire transfers, purchase/debit cards, consumer online activities, and checks. Such entities can include consumers, vendors, contractors, and the like. The sellers 112 receiving payment messages from the adapter layer can include, for example, retail establishments, utilities, suppliers, and the like. The buyers and sellers can optionally communicate directly with the adapter layer 104 rather than through the banking institutions 108. This optional communication path is indicated by the dashed lines from the buyers and sellers to the adapter layer.

In general, the adapter layer 104 exchanges data messages relating to making payment with the buyers/payers 110, and exchanges data messages relating to receiving payment with the sellers/payees 112. The MMOP hub 102 exchanges financial transaction data messages with the adapter layer 104 and communicates with the payment processing network 114 about the data messages. The payment processing network can comprise, for example, the proprietary processing network known as "VisaNet" available through Visa U.S.A. Inc. Those skilled in the art will recognize that the VisaNet network provides extensive expertise in card payment processing features, such as decisioning and risk management assessment, account management, account reconciliation, customer identification, and the like. After processing by the payment processing network 114, financial transaction data messages may be exchanged between the network 114 and the MMOP hub 102 and, in turn, between the MMOP hub and the adapter layer.

In this way, incoming data messages relating to a financial transaction that are initiated by a buyer/payer 110 can be operated upon by the adapter layer 106 to produce adapted data relating to the financial transaction, and the adapted data can be provided from the adapter layer to the MMOP hub 102 for processing. The MMOP hub determines routing to direct the adapted data for proper processing in the payment processing network 114. Within the network 114, intra-network communications concerning the adapted data are generated, the communications comprising requests for authorization by an issuer, requests for settlement and payment on the financial transaction to a transaction payee in response to authorizations, and responses to payee query requests from external payees for non-payment data. The payment processing network also generates extra-network communications to the external entities 106 for making a payment to a payee on the financial transaction.

The processing by the payment processing network 114 can include a variety of tasks associated with conventional card accounts, including authorization operations for clearance and settlement operations involving a card account, thus involving issuer and acquirer communications. In addition, the payment processing network can provide processing that involves extra-network communications to acquirer/payee institutions. The system illustrated in FIG. 1 brings the sophisticated card payment processing features noted above to an extended range of financial transactions, including commercial push transactions, bill payments, purchase card transactions, and original credit transactions. If desired, buyer/payees 110, such as consumers, can gain access to the system through a convenient interface, such as through a Web browser that communicates over the Internet. Such access would permit convenient consumer access for making online payments and purchases. Thus, the backend of the FIG. 1 system comprises a conventional payment processing network, such as the VisaNet network, and the frontend can comprise a Web-based consumer interface, along with network access through conventional entity interfaces for financial institutions such as banks, issuers, acquirers, and the like.

In the FIG. 1 system 100, the MMOP hub 102 performs a variety of functions to maintain data and assist in communications between the other entities in the system. The MMOP hub performs tasks associated with the payment processing network 114, such as setup and modification of records for communication with the financial institutions 108 such as banks, as well as customer support, business intelligence reporting, and risk management functions. The MMOP hub also interfaces with the financial institutions themselves, which may include entities that provide services to both corporate and consumer clients. The MMOP hub tasks include: profile setup and services for transaction participants; customer support functions; configuration of administration, such as transaction fees, terms and conditions, reports, payment status, report management, and configuration management, such as optional discounting and financing terms, and the like.

The MMOP hub 102 tasks associated with sellers/payees 112 can involve corporate sellers as well as consumers, both of whom supply goods and services to the buyers/payees 110. The sellers/payees use the MMOP hub 102 for presenting invoices and processing received payments. The seller/payee tasks of the MMOP hub include generating and submitting invoices, reporting, maintaining invoice and payment status of actions throughout the payment processing network 114, and user administration for access to the MMOP hub. The buyers/payers 110 can include businesses and corporations, as well as consumers, who purchase goods and services from the sellers/payees 112. The buyer/payer tasks of the MMOP hub 102 include generating reports and providing invoices, generating payments, scheduling payments, and user administration.

In addition to corporate and consumer buyers and sellers, the MMOP hub 102 can accommodate communications with a wide variety of entities who transact business and could benefit from the sophisticated processing of the payment processing network 114, even into types of financial transactions not conventionally served by such networks. For example, the MMOP hub can facilitate payment processing network communication with entities such as health care providers and clearing houses, insurance carriers, payment originators, and credit counseling agencies. Tasks associated with health care providers and clearing houses can include submission of claims in accordance with HIPAA and proprietary formats, reporting on claim details and payments status, payment data with associated metadata and text that includes claim information, and user administration. Tasks associated with insurance carriers can include: reporting on service providers and EDI clearing houses; notification of claims; generating claim payments; and user administration. Tasks associated with payment originators can include: co-branded payment portal capabilities for consumers; consumer support; configuration of fees, terms and conditions; and transaction reports, payment status reports, and summary reports. Tasks associated with credit counseling agencies can include: automation of debt management plan submissions and approval workflow, such that creditors can automatically accept proposals that meet preprogrammed acceptance criteria; and full audit trail for communication between credit counseling agencies and creditors.

The adapter layer 104 can support communications between the external entities 106 using a variety of communications protocols, preferably including HTTP and HTTPS, EDI interfaces, FTP and SFTP, Swift, VAN, and others known to those skilled in the art. Other communication protocols and mechanisms may be used. The adapter layer can include application programs and modules that are specially configured to support communications and exchange of data between the various external entities 106 and the MMOP hub 102 and, in so doing, support communications and exchange of data between the external entities and the payment processing network 114. The adapter layer manages communications portals with the external entities, ensures proper translation between data protocols and formats for processing by the MMOP hub for data exchanges back and forth between the MMOP hub and the external entities.

The MMOP hub 102 provides registration and setup features and workflow processing to provide management of entity profile registration and maintenance, business rule settings, fraud risk and loyalty program settings, and settlement and endpoint settings. The workflow processing features include guaranteed message delivery, routing and file transfer control, data transformation, service abstraction, and canonical data formatting. Some of the MMOP hub tasks are performed in conjunction with data format processing through the adapter layer 104. Those skilled in the art will understand the data operations and processing involved in providing such features.

In connection with registration, the MMOP hub 102 receives, registers, verifies, and permits modification of information from entities such as banks and other financial institutions servicing transaction participants, as well as information from payers, payees, third party entities including health care providers, clearing houses, insurance carriers. The information includes profile data and parameters such as routing numbers, DDA, account numbers, file formats, and delivery destinations. The MMOP hub platform supports multiple means of registering and maintaining profiles, including direct invitation, mass file upload from bank, self-enrollment, self-servicing and collection of data from existing VisaNet data stores (VMPD, CCDR, supplier locator, and other Merchant data warehouses).

The MMOP hub includes processing that enable buyers and sellers to set and modify rules on how payments are sent, received, and scheduled, including setting terms and conditions for such payments. The MMOP hub also enables OCTs to perform similar functions. The MMOP hub also performs processes that enable payers and payees to create and maintain manual and automated trade terms with their financial institutions (e.g. payables financing, receivables financing/discounting).

For security, the MMOP hub can limit access to account information for the payer and payee accounts to authorized persons only. In addition, the MMOP hub includes processing that enables payers and payees to create and modify transaction risk profiles as they relate to setting daily aggregates, single transaction limits, and multi-currency aggregates, as well as support alert and notification services that are triggered as the limits are approached.

The MMOP hub also includes processes that enable entities to register and maintain settlement endpoints, including a configurable registry of buyers and suppliers (payers and payees) with configurable industry specific fields: relevant/necessary profile and payment-related information including DDA, Merchant IDs, address and contact information; and financial and non-financial information as required to enable a range of buyer-initiated payment types (VisaNet products and non-VisaNet products). Profile information also includes methods of communication with MMOP (protocol), translation/mapping selection, and e-mail for message management.

The processing of the MMOP hub described above can be set up and controlled through an administrative interface of the MMOP hub, comprising a presentation layer. For convenient access by users, the MMOP hub processing is accessed by users of the system (transaction participants) through a conventional Web interface, such as through Internet browser applications. The Web-based operation enables relatively simple and convenient access control, as well as branding, personalization, and internationalization of partners or member institutions.

Payment Processing Network Operations

Figure 2:
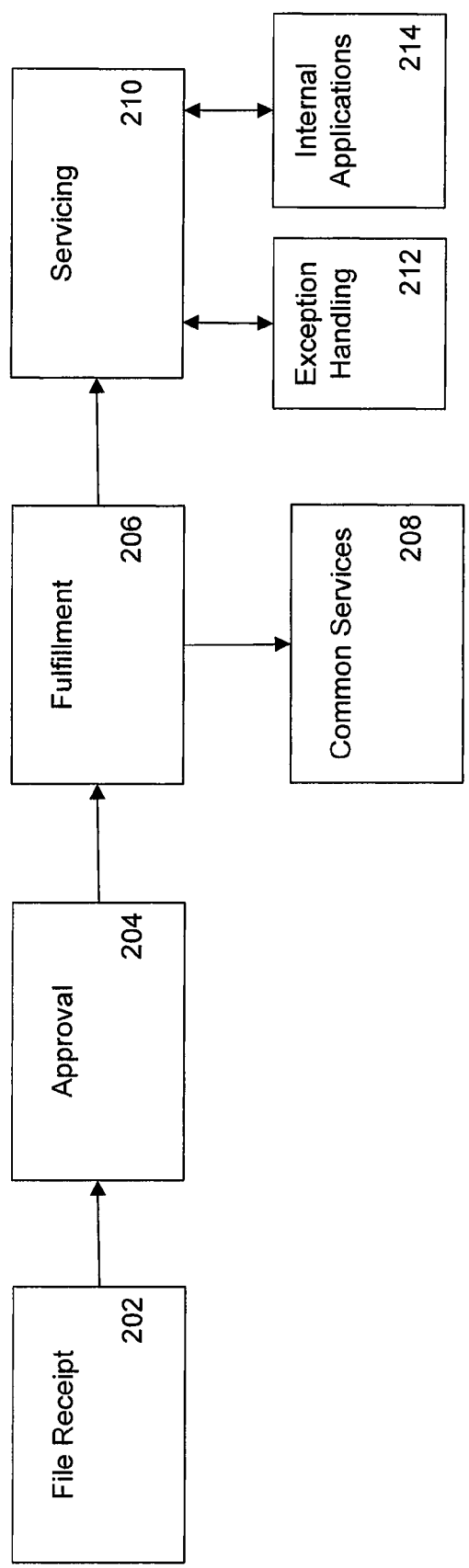
FIG. 2 is a schematic representation of the operations performed within the payment processing network illustrated in FIG. 1.

FIG. 2 is a flow diagram that illustrates the processing operations performed by the system illustrated in FIG. 1. Many of the operations rely on processing within the payment processing network 114, such as the VisaNet network. The adapter layer 104 and MMOP hub 102 process the incoming messages relating to financial transactions so they can be properly operated upon by the payment processing network and process the results of network operations for proper communications with the payer and payee entities. When a data message concerning a new financial transaction is received by the network, the initial file receipt operation 202 involves receipt processing to ensure proper communications, validation processing, and file acknowledgment creation.

In connection with input processing and file receipt operations, the MMOP hub 102 can support document imaging exchanges between senders and receivers, such as check images and the like. The MMOP hub can receive payment instructions specific to the payment processing network, such as using buyer-initiated transaction codes of the network, in connection with consumer credit, consumer debit, consumer prepaid, commercial prepaid, commercial credit, commercial debit, and purchasing card transactions. As noted above, the MMOP hub is accessed through a Web interface. As such, the MMOP hub 102 has Web servicing capabilities to support interaction with product modules using GUI-based components to generate invoices, modify invoices, track invoices, and execute payments. The MMOP hub also provides internet gateway capabilities for processing direct push payments from consumers (e.g. consumer bill payment, small business, consumer money transfers/P2P, and the like, including subsequent case management and support tasks). The MMOP hub also provides Internet gateway access through commercial banks.

With the adapter layer 104, the MMOP hub 102 can receive and process a wide variety of file types for multiple financial transactions, including NACHA-formatted files, wire transfer files (e.g. SWIFTNet, CHIPS, FedWire), checking account (e.g. X9.37) files, EDI financial file formats (e.g. EDI 820), data file formats (e.g. EDI 835, IFX, and RosettaNet), and automated feeds from ERP and manual uploads. The MMOP hub also can provide image storage or link to external storage facilities.

The MMOP hub 102 can provide acknowledgement of file receipt (notification) in batch mode processing, typically providing acknowledgement several times throughout the day, or if operations require more frequent update, the MMOP hub can provide file receipt acknowledgement in real-time. The MMOP hub also supports validation routines specific to the type of payment or payment instructions contained in incoming files, such as checks, ACH, wire transfers, and proprietary payment products of the payment processing network.

The next operation, approval 204, includes authentication of the transmitting entity and of the corresponding profile. In addition, approval involves transaction qualification, fraud detection, and transaction translation to ensure compatibility of data protocols and the like. For the approval and authentication functionality, the MMOP hub 102 authenticates sender based on entity profile and pre-determined criteria stored in a registry. The MMOP hub includes a user interface that supports configurable rules for document/template screening that will detect and reject missing fields or erroneous data and initiate resubmission workflow, thereby assisting the user in proper approval and authentication.

The MMOP hub also includes processing for configurable risk-based rules for factors such as transaction size, quantity, and type, sender/receiver identity, time of day, day of week, and the like. Increased efficiency is obtained by MMOP hub rules-based workflow to allow for automated acceptance of terms based on predetermined criteria. Thus, the MMOP hub performs rules checking to facilitate authentication of transactions and detect potential fraud.

In the next operation, fulfillment 206 includes payment and data parsing into relevant data fields and records, and rules-based interface routing. The fulfillment processing may include common services operations 208, which may include, for example, operations to ensure regulatory compliance, analytics for loyalty programs, analytics for risk assessment, foreign currency exchange services (such as enabling use of charge cards anywhere in the world, irrespective of whether or not the transaction occurs in the currency associated with the cardholder account), financial trade processing, scheduling, data warehousing, and archival operations. Other services may be included, as desired. The fulfillment operations include the full range of services and processing offered by the payment processing network, such as the VisaNet network.

As part of the fulfillment operations, the MMOP hub 102 can parse payment and data files based on field values, and pre-configured rules including splitting bulk payments. The MMOP hub also can facilitate calculations including accrued interest and discount rates, due dates, pre-payment adjustments, late payment penalties and interest, and loss sharing on behalf of the seller. The MMOP hub also routes parsed payments and data to the appropriate interfaces based on pre-configured rules or fields values, including thresholds, limits, and least-cost routing, and also can accommodate rules-based decisioning or manual override capabilities between parties when the rules-based workflow does not meet predefined criteria.

The MMOP hub includes various modules or platforms to provide fulfillment operations, of which may interface with modules of the payment processing network to provide the fulfillment operations. For example, the MMOP hub includes an interface to a regulatory component for compliance with U.S. domestic regulations such as HIPAA. The MMOP hub also can interface with components such as a loyalty accumulator for compiling loyalty drivers for traditional card-based transactions and for compiling loyalty drivers across multiple transaction types and dynamically offering loyalty rewards at the point of sale. The MMOP hub also interfaces with a Risk Analytics component capable of applying scoring techniques against specific transactions, amount/velocity limits, buyers, sellers, and timeframes to determine an overall risk rating. Other interfaces within the MMOP hub permit interaction with components for a data warehouse and document repository capable of storing and indexing data in multiple formats for retention, retrieval and presentment; a transaction scheduler capable of delayed payment and data distribution based on configurable rules. Other features of financial transaction processing provided by the payment processing network can be accessed by the MMOP hub, as will be recognized by those skilled in the art in view of the description herein.

After fulfillment 206, the next operations comprise servicing 210. The servicing operations involve payment authorization, network applications interface operations, payment and remittance processing, messaging and acknowledgment processing, transaction balancing, and transaction pricing and fees processing. The servicing operations may include exception handling 212 and various internal operations 214. The exception handling may include case management, fraud management, and adjustments processing. The internal application typically include billing operations, gain and loss processing, and other proprietary operations unique to the payment processing network.

Base Transaction Flow

Figure 3A:
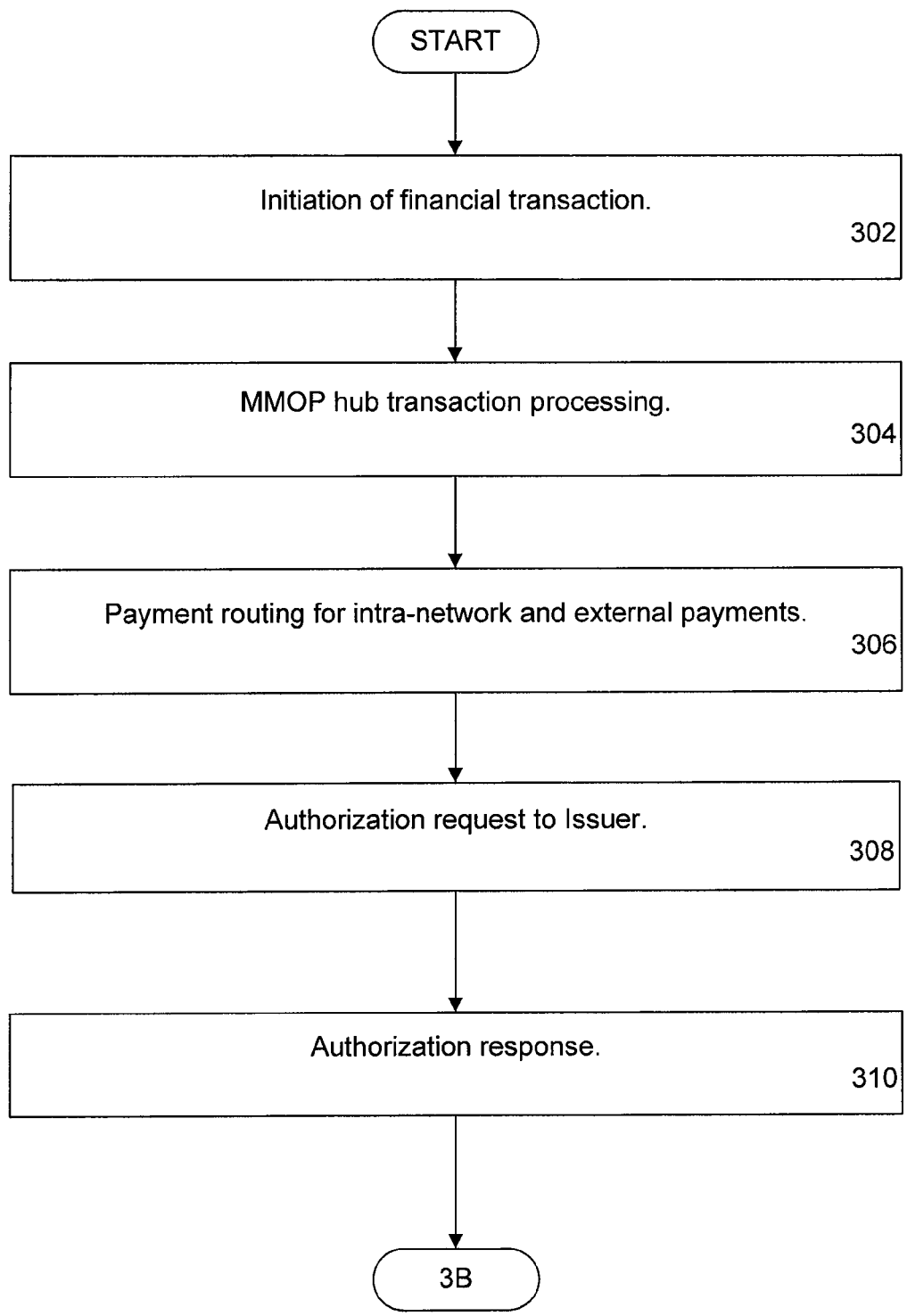
FIG. 3A and FIG. 3B provide a flow diagram of base transaction flow operations performed by the FIG. 1 system.
Figure 3B:
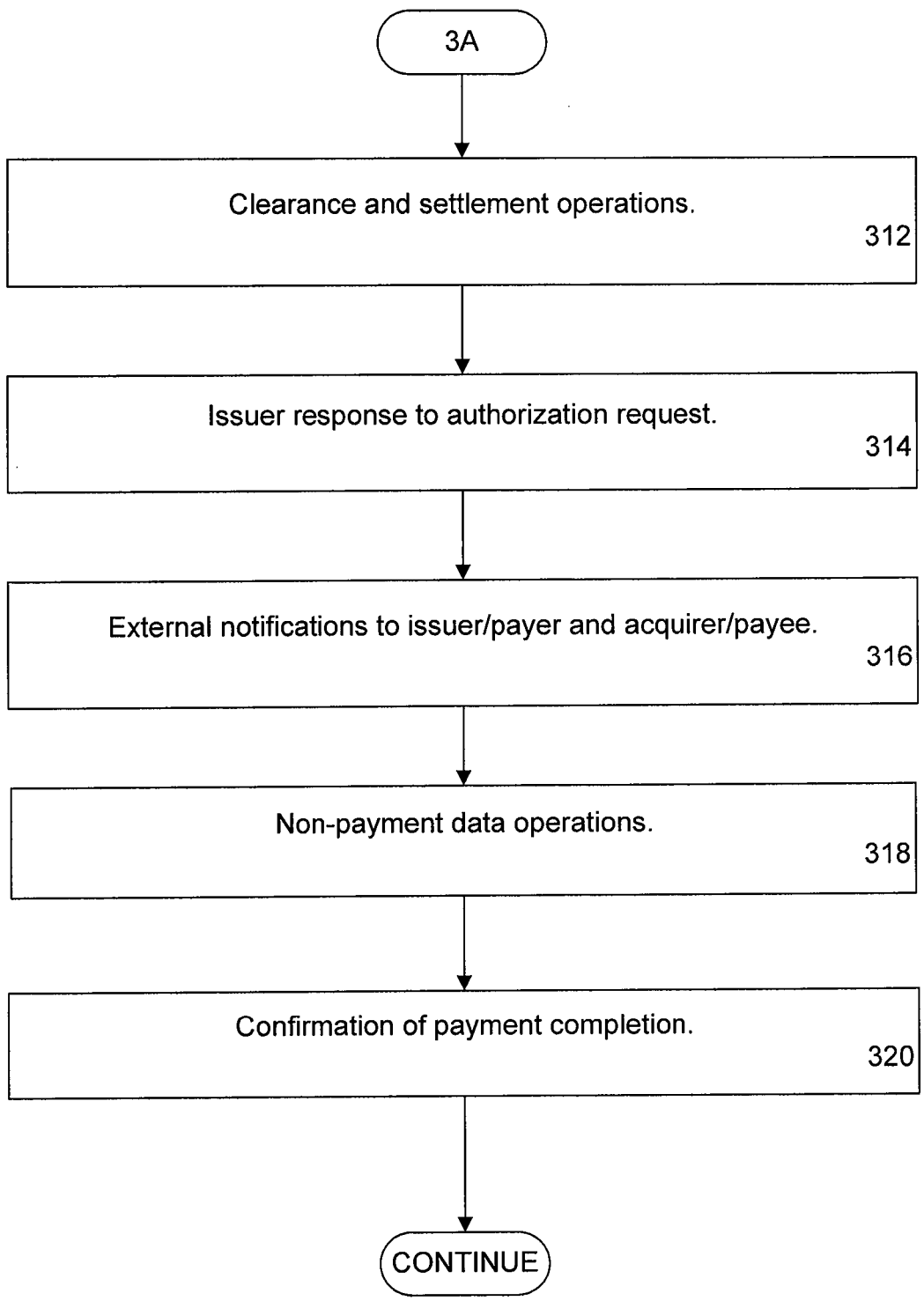

FIGS. 3A and 3B provide a flow diagram of base transaction flow operations performed by the FIG. 1 system. That is, the system 100 generally performs the base transaction flow operations across all implementations. Specific operations may differ, depending on the nature of the financial transaction being processed. Different types of financial transactions will typically require corresponding different modules or applications in the adapter layer to accommodate the different types.

In the first operation, indicated in FIG. 3A as initiation of a financial transaction 302, a payer/buyer initiates payment either as part of an Accounts Payable file or a payment message. As noted above, payer/buyer entities may include consumers, companies, vendors, contractors and the like, making purchases and making payments through credit cards, wire transfers, purchase/debit cards, consumer online activities, and checks. The payment is initiated with a corresponding data message and is processed by the adapter layer to produce adapted data relating to the financial transaction in question. The adapted data is formatted to the appropriate data protocol and format so the data can be operated on by the payment processing network and provide payment instruction data.

In the next operation, indicated as MMOP hub transaction processing 304, the MMOP hub receives incoming payment files and/or payment messages. The incoming data comprising files and/or messages are the result of the processing by the adapter layer. The MMOP operations 304 involve validation, application of business rules, scheduling of payments, and transformation and optimization of payments as required. Additionally, payments may be flagged for proper routing by setting data values or fields in data records, or appending data values and the like, as will be known to those skilled in the art.

The next base transaction operation involves payment routing 306 for both intra-network and external payments. In particular, as the payment data is received, the MMOP hub will extract and reformat the payment instruction data into the specified format defined by each entity making use of the payment processing network. Each such participating entity may also be referred to as a payment partner. The MMOP hub processing includes operations that will result in each transaction being staged, queued, and ready to send to the appropriate payment partner at designated release times for each payment partner. The payment routing may include operations for payment utilizing the card processing features of the payment processing network, or the payment routing may involve payment through alternative means, such as wire transfers, checks, clearing house operations, and the like.

In the case of card payment techniques, such as conventional VisaNet operations, the financial transaction typically involves a payment (credit) card, an original credit transaction (OCT), an issuer-to-issuer (i2i) transaction, or a bill payment. That is, bill payment can be facilitated with the MMOP hub through payment transacted across the conventional card processing network, such as the VisaNet network, and bill payment can be facilitated across external networks and methods of payment, through MMOP hub processing interface with the external networks. In the case of external payments, the financial transaction typically involves automated, clearing house transactions, wire transfers, and checks.

The next operation involves an authorization request to an issuer 308. The authorization request comprises a financial message sent across the payment processing network (such as VisaNet) to an issuer of the account in question for an authorization to charge the account, or decline the charge. The authorization request may comprise a standard authorization request or a secondary authorization. The secondary authorization is related to a proposed issuer-to-issuer (i2i) transaction type. Other types of authorizations may be accommodated, as well. After the authorization request has been sent, an authorization response is received 310. The issuer of the card associated with an account responds to the authorization request with an authorization or a decline. The response is provided from the issuer to the payment processing network. If authorization is received, operations proceed to the next operation (FIG. 3B). If authorization is declined, then processing of the request is completed (without approval).

If authorization was received in the prior operation 310, clearance and settlement operations 312 may begin, as indicated at the first operation of FIG. 3B. Those skilled in the art will be familiar with clearance and settlement operations associated with card transactions. For example, in the case of transactions processed across the VisaNet payment processing network, banks will net settle their daily positions and wire funds as required according to defined schedules. After clearance and settlement operations, the card issuer will generate a response to the authorization request 314. The authorization response will be provided from the issuer to the MMOP hub, for transmitting back to the payer.

External notification 316 takes place next, involving notifications to issuer/payer and acquirer/payee entities from the payment processing network. In the case of an issuer/payer bank, proprietary reports, data feeds, and the like may be provided by the issuer/payer bank to the payer as a standard or value-added service outside of the MMOP hub processing. In the case of an acquirer/payee bank, proprietary reports, data feeds, and the like may be provided by the acquirer/payee bank to the payee as a standard or value-added service outside of the MMOP hub processing.

The MMOP hub also provides access to non-payment data operations 318. For example, the MMOP hub provides non-payment data or remittance advice to payees. Such services can include information including invoice-level, line-item detail relating to the financial transaction. The non-payment data operations can include a variety of reports and notifications useful to transaction participants. For example, the MMOP hub can provide a bank view of settlements, including daily positions, future estimates, and historical transactions with flexibility to present the data according to individual buyer, individual seller, or net to bank. The MMOP hub can also provide a corporate view of settlements, including daily positions, future estimates, and historical transactions. The non-payment data operations include reporting and ad-hoc querying, and can support hierarchal account reporting by department, region, account number, and cost centers. In addition, the MMOP hub supports regulatory and compliance reporting requirements including OFAC, AML, Reg C, Reg, E, SEPA, and HIPAA.

Lastly, the system provides confirmation 320 of payment completion to the payer and/or the payee. In this way, the system provides access to payment processing network features to a broad class of financial transactions, including payments by check, online banking, and the like.

Financial Transaction Processing Using the NIMOP Hub

Figure 4:
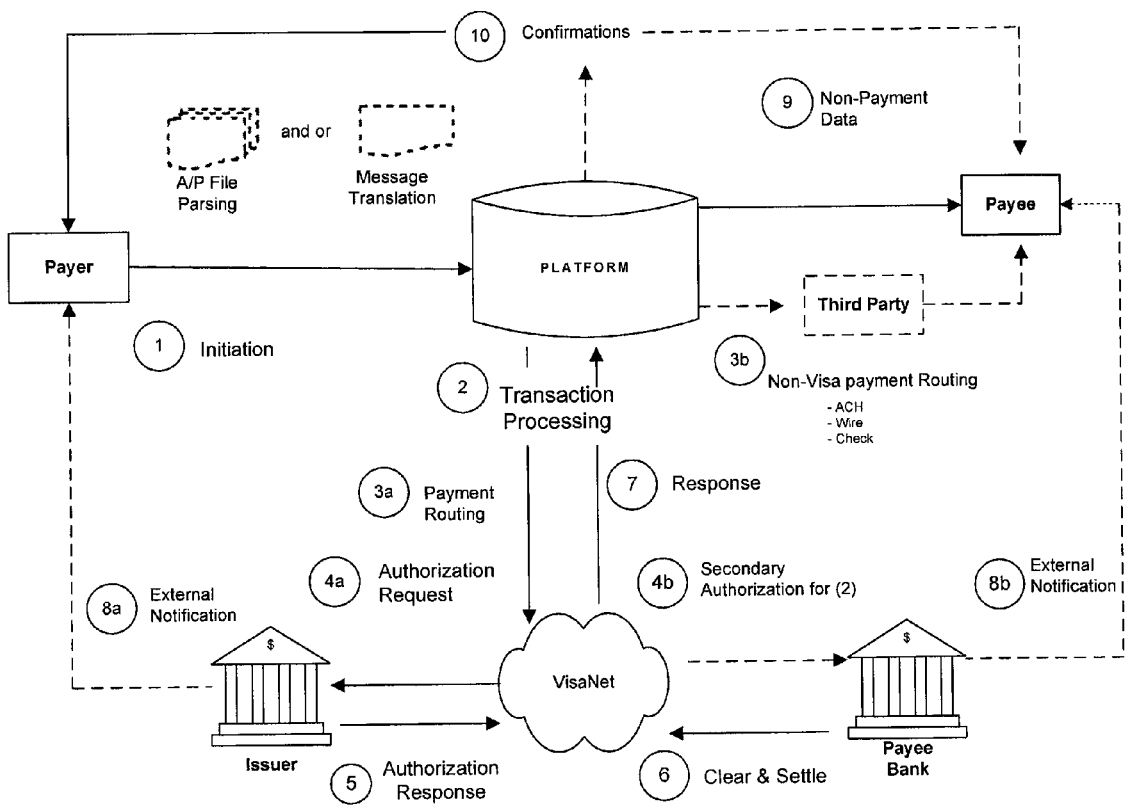
FIG. 4 is a schematic representation of the FIG. 1 system operations illustrated in FIG. 3A and FIG. 3B for transactions, including commercial push transactions.

FIG. 4 is a diagram of the transaction flow of the system operations illustrated in FIG. 3A and FIG. 3B. The FIG. 4 operations follow the sequence indicated by the numbers within circles, starting with (1), followed by (2), and so forth. The sequence of FIG. 4 operations corresponds to the sequence described in connection with FIG. 3A and FIG. 3B. Thus, the FIG. 4 Initiation operation (indicated in FIG. 4 by the encircled "1") corresponds to the FIG. 3A initiation operation 302. This operation is initiated by the payer. Optional data flows in FIG. 4 are indicated by dashed lines.

FIG. 4 indicates that the Initiation operation (1) involves processing of accounts payable files and/or message translation by the adapter layer to permit processing by the MMOP hub of the data relating to a financial transaction. In this way, the MMOP hub (represented by "Platform" in FIG. 4) functions as an acquiring platform for buyer-initiated payment transactions and also functions as an intelligent routing apparatus for non-financial EDI messages and queries and notifications. A variety of transaction types can be accommodated, in accordance with the adapter layer processing. For example, the illustrated MMOP hub can process financial transaction types including commercial push payments, bill payments by consumers and small businesses, purchase card push transactions, and original credit transactions. Processing of these transaction types will be described further below.

The FIG. 4 Transaction Processing operation (2) corresponds to the MMOP hub transaction processing 304 of FIG. 3A. That is, once a payer initiates a payment and the translated financial transaction information is received at the MMOP hub platform, the transaction information is provided by the MMOP hub to the payment processing network, which is indicated in FIG. 4 as "VisaNet", or to a third party for external network payment. The FIG. 4 Payment Routing operations (3a and 3b) correspond to the FIG. 3A payment routing operation 306. In FIG. 4, intra-network payment routing (3a) is indicated as information flow from the MMOP hub to the "VisaNet" payment processing network, and external payment routing (3b) is indicted by information flow from the NIMOP hub to a third party and then to the payee. As noted above, the external payment routing involves wire transfers, checks, automated clearing house transfers, and the like.

The FIG. 4 Authorization Request (4a) and Secondary Authorization Request (4b) correspond to the FIG. 3A authorization request to issuer operation 308. The Authorization Request (4a) relates to issuer authorization requests are needed for approval of card transactions. Such requests involve information flow from the MMOP hub to the payment processing network (VisaNet) and then to the issuer. The Secondary Authorization Request (4b) relates to issuer-to-issuer (i2i) requests, wherein a first issuer provides authorization back to the MMOP hub and then the secondary authorization request is sent to a second issuer.

The FIG. 4 Authorization Response (5) shows information flow from the issuer to the payment processing network, and corresponds to the FIG. 3A Authorization Response operation 310. After the transaction payment has been authorized at (5), the next operation involves clearance and settlement (6) from the payee bank. The FIG. 4 clearance and settlement operation (6) corresponds to the clearance and settlement operations 312 of FIG. 3B. The FIG. 4 Response operation (7) corresponds to the issuer response operation 314 of FIG. 3B and involves sending the authorization response message from the issuer through the payment processing network back to the MMOP hub. The FIG. 4 notifications (8a, 8b) correspond to the external notifications operation 316 of FIG. 3B. That is, the system can provide external notifications to payer and payee, which can comprise notifications directly from the issuer to the payer (8a) and from the payee bank (sometimes referred to as the acquirer, if a card transaction is involved) to the payee (8b).

The system also provides for non-payment data operations, which support database management operations, query processing, administrative tasks, and the like. The FIG. 4 non-payment data operations (9) correspond to the FIG. 3B non-payment data operations 318 and are indicated as involving information flow from the MMOP hub to the payee. That is, the payee receives the results of non-payment data operations. Lastly, the FIG. 4 Confirmation operations (10) to the payer and payee correspond to the FIG. 3B confirmation of payment completion operation 320.

If the financial transaction is a commercial push transaction comprising a transaction such as an automated clearing house (ACH) transaction or card (charge) transaction, the MMOP hub will perform the FIG. 4 operations, and will match payee data provided by the payer and determine routing information to process the transaction and direct the information flow within the payment processing network. Those skilled in the art will understand that a push transaction involves transaction processing initiated by the cardholder or buyer, as opposed to a more typical transaction that is initiated by the merchant or supplier. The MMOP hub will indicate that the transaction is a commercial push transaction, thereby ensuring proper handling within the payment processing network. The indication may take the form of setting a data field in a transaction record or appending a data message with appropriate transaction-indicating codes. Thus, appropriate authorization operations and clearance and settlement operations will be performed in the payment processing network. In particular, payment authorization will be processed through the payment processing network and non-financial EDI and remittance data will be transmitted to the payee.

Figure 5:
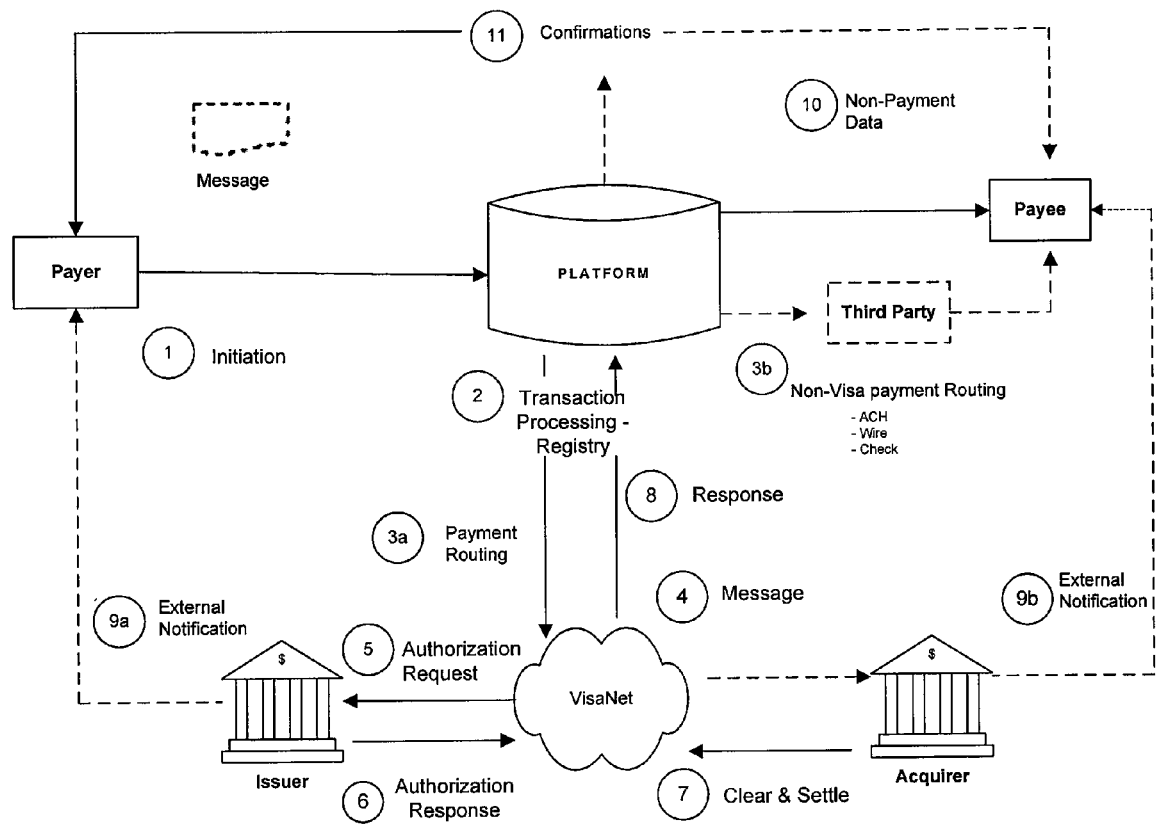
FIG. 5 is a schematic representation of the system operations performed by the FIG. 1 system for a buyer-initiated bill payment transaction.

If the financial transaction is for bill payment, such as by a consumer or small business entity as payer, then the system will perform the operations illustrated in FIG. 5, which differ only slightly from the sequence illustrated in FIG. 4. For the bill payment transaction, per FIG. 5, the MMOP hub will process the transaction information received from the adapter layer and will indicate that the transaction is a bill payment transaction, thereby ensuring proper handling within the payment processing network. The MMOP hub will match the payee merchant data to necessary merchant acquirer routing information that is determined from merchant registry data maintained by the payment processing network. That is, the MMOP hub will include data stores necessary for its processing, but as much as possible, any registry data maintained by the MMOP hub will not contain data that is redundant with existing databases (such as those of the payment processing network). Thus, the MMOP hub operates such that there is heavy re-use of supplier and merchant data stores associated with the payment processing network. Any authorization and clearance/settlement operations will be performed through the payment processing network using transaction codes of the network. For bill payment, no secondary issuer authorizations are involved, rather, payment routing (3a) in the payment processing network involves sending payment messages (4) to an acquirer and routing an authorization request to the card holder's issuer (5). The authorization response (6) follows, and after clearance and settlement (7), the authorization response (8) is returned to the MMOP hub. In the case of bill payments through the payment processing network, which involve payment through a card account, the "Payee Bank" in FIG. 4 is replaced by the acquirer as shown in FIG. 5.

Figure 6:
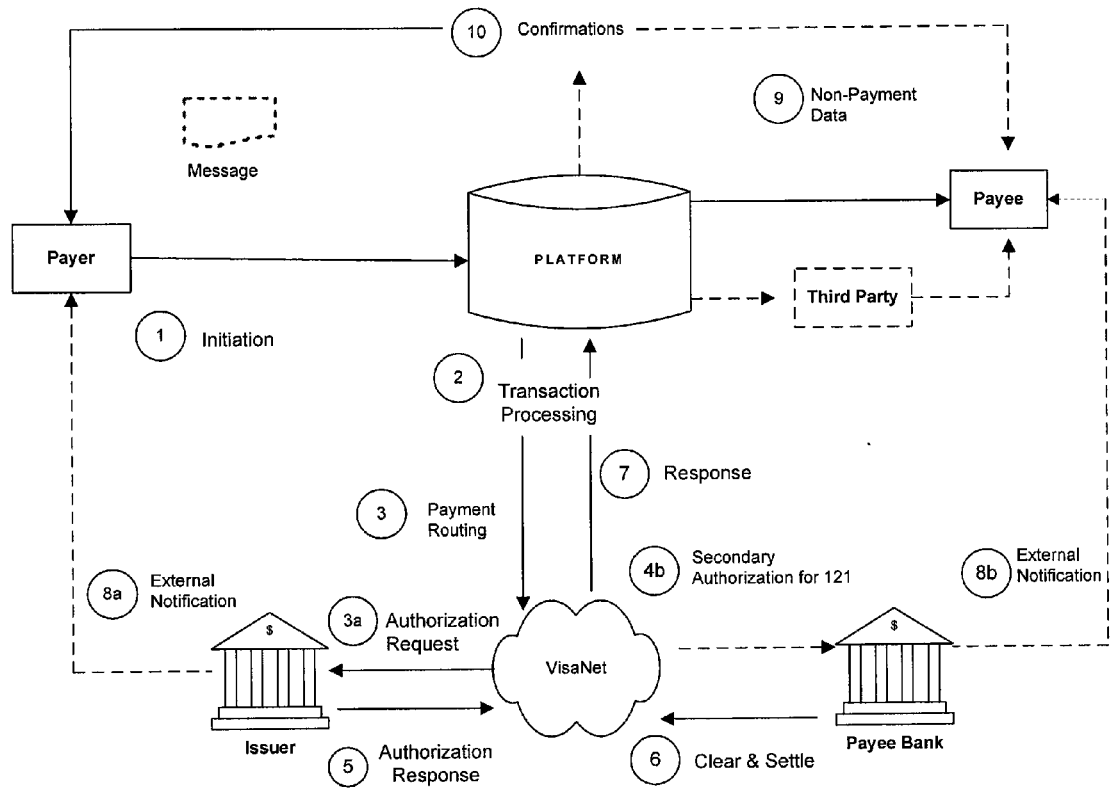
FIG. 6 is a schematic representation of the system operations performed by the FIG. 1 system for a buyer-initiated purchase card transaction.
Figure 7:
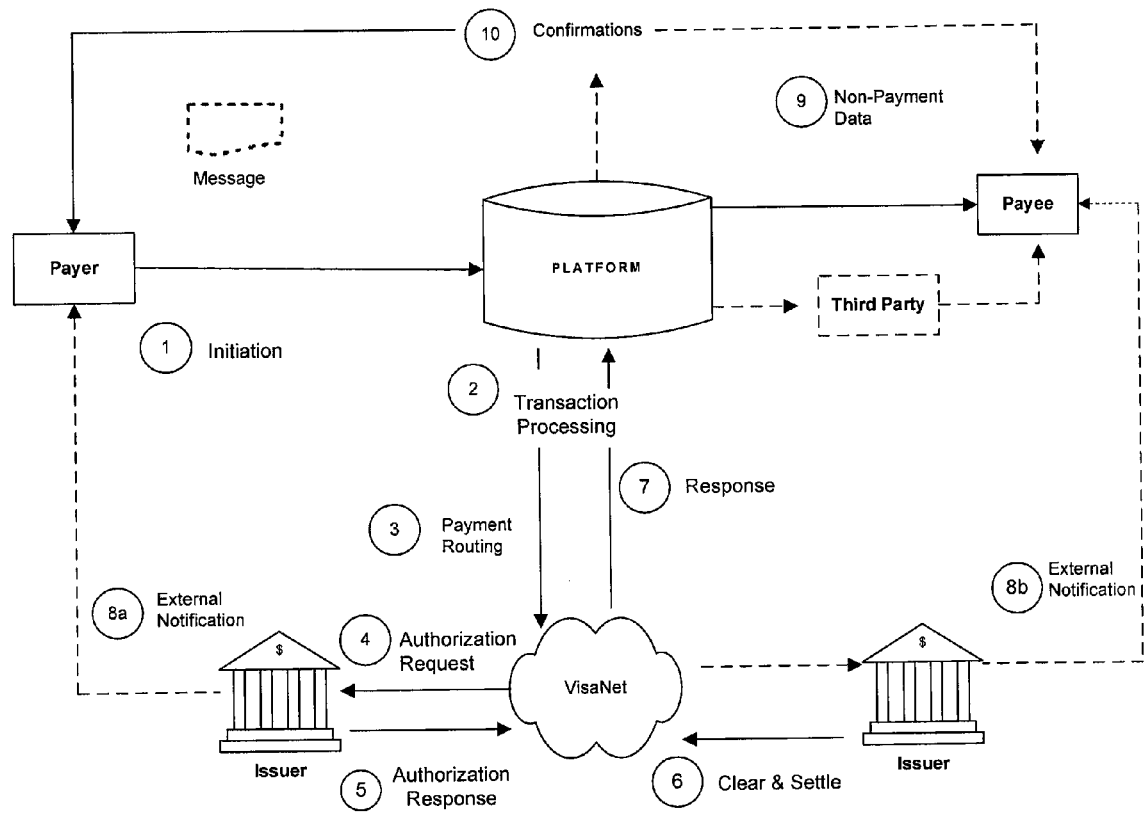
FIG. 7 is a schematic representation of the system operations performed by the FIG. 1 system for a buyer-initiated original credit transaction.

If the financial transaction is for a purchase card transaction, then the MMOP hub will operate as illustrated in FIG. 6 and will process the transaction information from the adapter layer and will indicate that the transaction is a purchase card transaction, thereby ensuring proper handling within the payment processing network. The MMOP hub will match the payee data provided by the payer for routing information into the payment processing network. Because the transaction is a purchase card transaction, no third party payments are involved, and FIG. 6 indicates that the payment routing (3) is only to the payment processing network. It is possible that secondary issuers may be involved, so FIG. 6 shows both an authorization request (4a) and a secondary authorization request (4b). As with the base transaction processing, the authorization response (5) is followed by clearance and settlement (6) and an authorization response (7) to the MMOP hub. In the payment processing network, authorization operations and clearance and settlement operations for the purchase card transaction are performed using appropriate push transaction codes. In the case of a purchase card transaction, no external payment routing is generally involved If the financial transaction is for an original credit transaction (OCT), such as initiated by a consumer, then the MMOP hub will operate as illustrated in FIG. 7 and will process the transaction information from the adapter layer and will indicate that the transaction is an OCT transaction, thereby ensuring proper handling within the payment processing network. The MMOP hub will match the payee data provided by the payer for routing information into the payment processing network. The OCT processing is analogous to conventional credit transaction processing. Thus, FIG. 7 indicates that the payment routing (3) is only to the payment processing network and an authorization request (4) goes to the issuer, followed by an authorization response exchange (5), clearance and settlement (6), and payment processing network response (7) to the MMOP hub. The payment processing network will process the transaction utilizing OCT transaction codes to direct the authorization operations and clearance and settlement operations. In the case of an OCT transaction, the issuer takes the place of the payee bank in FIG. 4.

Figure 8:
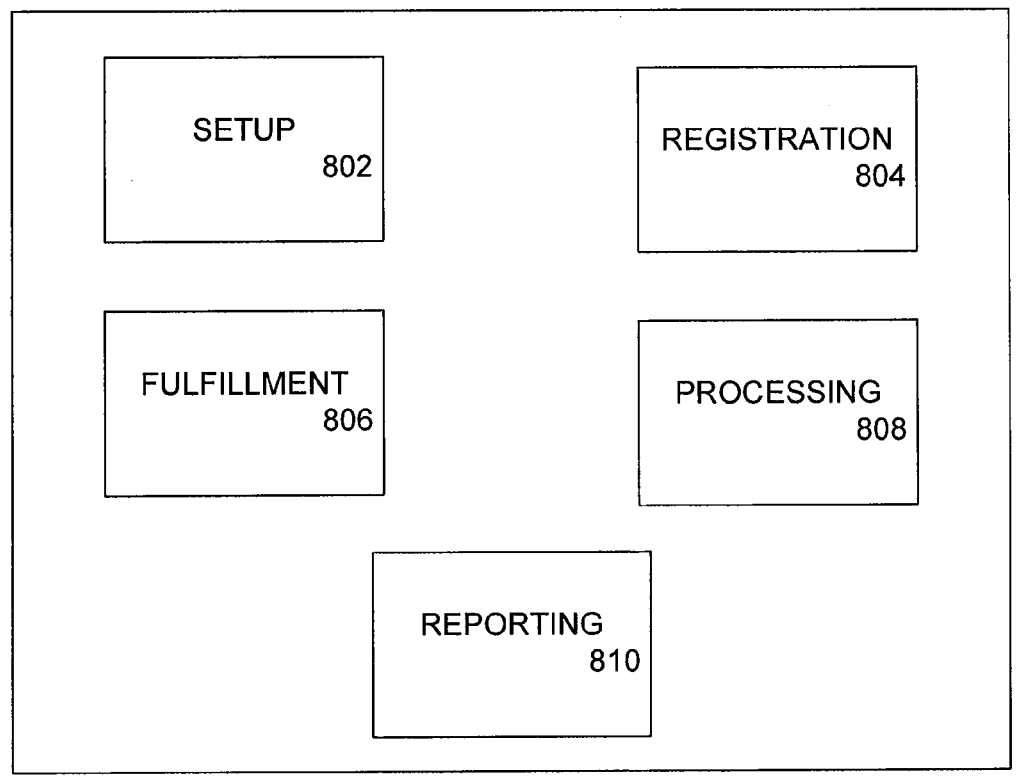
FIG. 8 is a block diagram representation of the MMOP hub illustrated in FIG. 1.

FIG. 8 is a block diagram representation of the MMOP hub 102 illustrated in FIG. 1. As described above, the MMOP hub assists in processing financial transactions from a wide variety of payment types, thereby comprising a global payment hub. As a global payment hub, the MMOP hub provides comprehensive business-to-business payment processing capabilities for participating members of the payment processing network and their corporate clients. Those skilled in the art will understand that payment processing networks, such as the VisaNet network, are configured to communicate with, and provide processing for, only for participating members. The MMOP hub is adapted to facilitate processing multiple forms of domestic and global payments from the accounts payable (AP) files of members and their clients. Additionally, the MMOP hub provides an entry point for push payment transactions and also provides the ability to optimize payments across the respective payment methods. The MMOP hub also provides a means for the payment processing network and the member financial institutions to deliver additional value-added offerings such as supply chain finance.

FIG. 8 shows that the MMOP hub 102 includes modules, or processes, including setup 802, registration 804, fulfillment 806, processing 808, and reporting 810. The MMOP hub receives input financial transaction messages from the adapter layer so that incoming data is in the proper format for processing by the payment processing network, and in addition, the setup module 802 of the MMOP hub receives communications from an administrative interface that permits registration and the like. In particular, the setup module confirms the identification and membership status of a user communicating with the module through the administrative interface of the MMOP hub for becoming a payment partner, which is an entity or company who has contracted for processing involving the MMOP hub and payment processing network. The setup module 802 attends to registration of entities as payment partners, and also attends to any other administrative tasks associated with the MMOP hub and payment processing network.

After setup is completed, the MMOP hub registration module 804 performs identification of any buyers who wish to register with the MMOP hub through the administrative interface. Upon confirmation of buyer identification, the registration module permits registration of buyer entities (e.g., buyers, payers, cardholders, and the like) and suppliers.

The MMOP hub also contains a fulfillment module 806 to perform processing of incoming financial transactions. First, the fulfillment module receives an accounts payable (A/P) file from an originating entity. The A/P file may comprise a buyer file, a buyer FI (Financial Institution, e.g., a bank), a buyer SCI (supply chain integrator), or a buyer ERP (enterprise resource planning application). The fulfillment module 806 responds to receipt of the A/P file with an acknowledgement message and then performs file validation to process the information in the file and integrate it into the database of the MMOP hub and the payment processing network. The module then extracts the necessary data and performs optimization and decisioning, as needed. The next operation of the fulfillment module 806 is that of staging for data preparation and routing within the system. The routing may involve, for example, routing to the processing module 808, or may involve routing to a supplier (payee).

If the fulfillment module 806 provides message data to the processing module 808, then the fulfillment module will receive back a settlement message from the processing module, and will generate a file receipt. The fulfillment module will then generate an acknowledgement and perform file validation. The module will next perform an update of the database and associated records for the financial transaction, and will extract data relevant to A/P records and then route such extracted data to the proper buyer channels.

In the processing module 808, information from the fulfillment module 806 is forwarded to either an ACH partner, a wire transfer partner, a check fulfillment partner, or the payment processing network for processing and settlement. The settlement information is provided to corresponding suppliers and, if appropriate, information is provided back to the fulfillment module to acknowledge settlement.

The reporting module 810 of the MMOP hub 102 generates reports. The report generation module permits authorized administrative users to search for data on desired payment transactions, and to view such data and download or retrieve such data.

As noted above, the adapter layer 104 provides an interface that facilitates capture of financial transactions data for processing by payment processing networks such as the VisaNet network. In addition, the adapter layer and MMOP hub 102 have a system architecture that permits modular integration of new lines of payment streams as they arise, via communication between the external incoming data for new lines of payment and the adapter layer, and the communication between the adapter layer and the MMOP hub. One of the lines of payment streams that can be accommodated in this way is that of online banking with card programs, such as charge cards and debit cards. Online banking is convenient for consumers, because consumers have direct access to making payments from their checking and savings accounts with a bank, and can provide such payments directly to participating payees with whom the consumers have business relationships and carry out transactions. Current online banking systems, however, do not permit initiating charges and payments from a consumer's card accounts.

The efficiency gap between the biller-direct and consolidator models increases as more of the bills managed by a household are paid online, regardless of payment method used. The consolidator model relates to third-party organizations other than the biller who collects, aggregates, and remits payment to the biller on behalf of the payer. This type of payment transaction is typically not a card-based transaction and is usually confined to paper check and ACH-based payment methods that are batch processed (i.e., not processed in real time). Consumers would benefit greatly if they could integrate online banking with their card accounts. Such integration would enable consumer cardholders to log on to their bank's Web site and pay their bills using a credit, debit, or prepaid card or direct deposit card for any merchant that accepts such card account products using online bank origination. Such online-card account integration can be provided by the system described herein including the MMOP hub and payment processing network The system of FIG. 1 can provide online banking services through at least two techniques: (1) backend payment service through card accounts; and (2) bill payment through frontend and backend services on such card accounts. The backend services involve using the payment processing network to make payment, such as making payment through cardholder accounts. The frontend and backend combination can involve an interface between the MMOP hub and conventional online banking facilities of banks and financial institutions. To provide such features, the MMOP hub includes an online banking module or application through which an authorized user can gain access to the user's cardholder account. For example, a conventional online banking Web interface from a bank or financial institution may include a "Bill Pay" tab or link to initiate the MMOP hub interface and processing.

Figure 9:
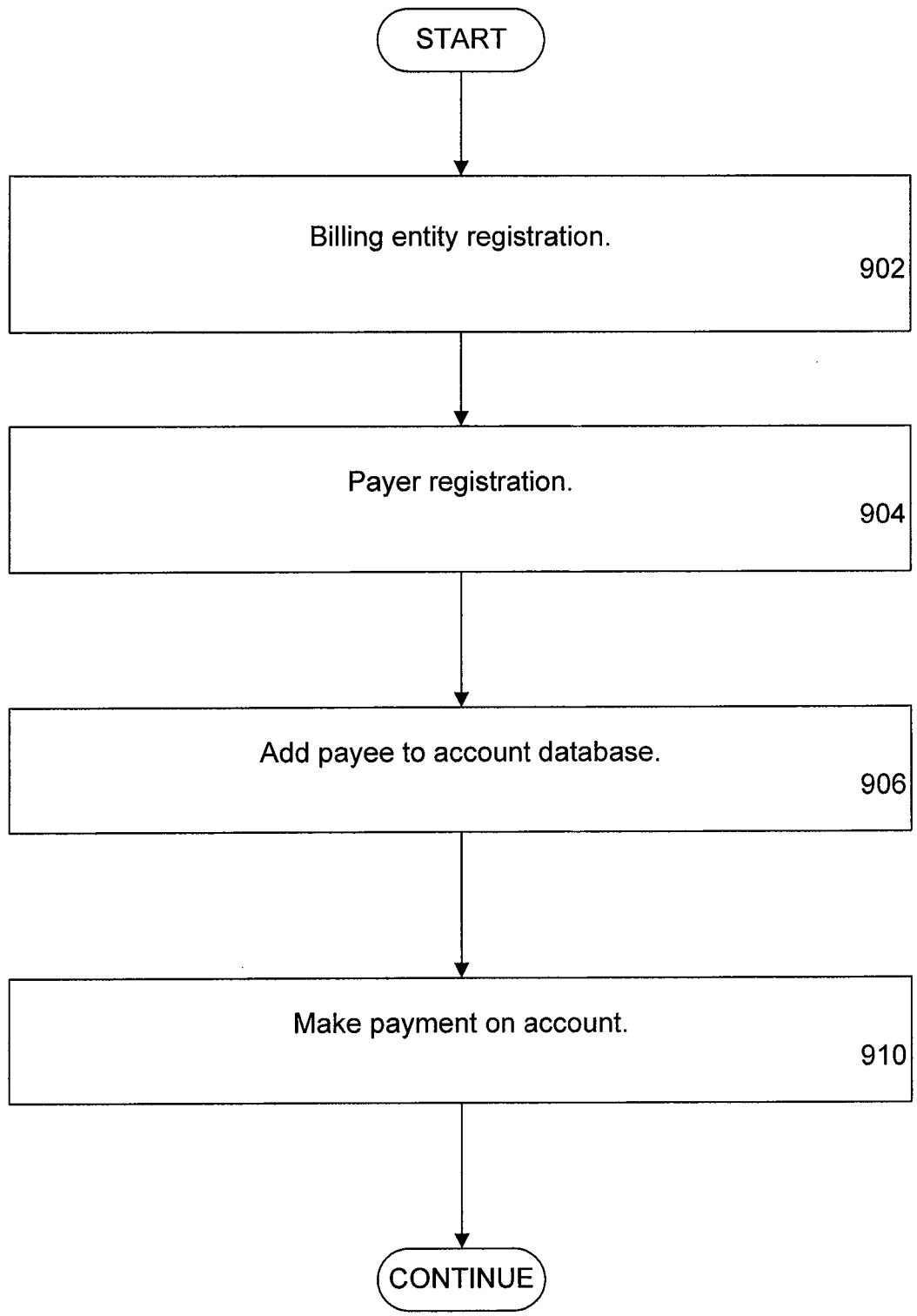
FIG. 9 is a flow diagram that illustrates online banking operations performed by the system illustrated in FIG. 1.

FIG. 9 is a flow diagram that illustrates online banking operations performed by the system illustrated in FIG. 1. In the first operation, a billing entity must register 902 with the system. A billing entity may be a retail establishment, an online vendor, a utility, or any other provider of goods and/or services who wants to accept payment directly from cardholders through the payment processing network. The billing entity registration involves registration and identification followed by authentication and creation of a universal biller file in the database accessed by the MMOP hub and payment processing network. Those skilled in the art will understand that a "universal biller file" typically includes information such as biller ID information, biller company ID, account number mask or structure edits, biller financial institution ID and routing information, any biller DBA name, the address that appears on customer bills, customer biller account number, biller customer service contact, biller systems support contact, customer contact, and other similar data. A billing entity profile data record is also stored in the database, for administrative needs.

The next operation in the online banking scenario is for a user (payer) to be registered 904 with the system. The payer must register and provide identification and authorization information, and therefore must have an established cardholder account with a member institution of the payment processing network, such as a VisaNet affiliate. To use the online banking facility of the FIG. 1 system to make a payment, the payer must log into the online banking application of the MMOP hub to gain access. Once the user has access, the user can initiate or maintain a user profile that identifies the cardholder accounts through which payment will be made.

After a payer user has registered with the online banking facility of the system, the user may add payees to the user's profile database 906. The online banking application provides an interface to do so, and permits the user to select options such as report and receipt generation, billing entity identification, payee lists, and the like, and to conduct searches of records, edit profile data, and so forth in the user database.

Once a payer user has populated the user database with payee information, the user can make payments via the online banking facility 908. Online banking permits users to select a payment source (account) and to specify the amount of the payment transaction, as well as set the date on which payment will be made. The user can also specify a one time payment or a regular payment (for example, automatic payment of a utility bill at monthly intervals). Using the system described herein, the user can draw from an account at a bank or other financial institution, or the user can draw from a card account, such as a charge card, debit card, or the like.

The above description is illustrative and is not restrictive. Many variations of embodiments constructed in accordance with the invention will become apparent to those skilled in the art upon review of the disclosure. The scope of the invention should, therefore, be determined not with reference to the above description, but instead should be determined with reference to the pending claims along with their full scope or equivalents.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

We claim:

1. A system for processing financial transaction data, the system comprising:
   an adapter layer that receives an incoming data message having a message format of a transaction system that is external to a payment processing network that processes transactions relating to an account managed by an issuer who utilizes the payment processing network, the incoming data message relating to any one of a financial transaction initiated by a payer, an authorization request, and a payee query request, and such that the adapter layer operates on the incoming data message to change the format of the incoming data message and produce adapted data relating to the financial transaction in a message format suitable for processing by the payment processing network;
   a processor hub that receives the adapted data and determines transaction routing to direct the adapted data to the payment processing network, wherein the payment processing network generates intra-network communications comprising requests for authorization by the issuer, requests for settlement and payment on the financial transaction to a transaction payee in response to authorizations, and responses to payee query requests from payees external to the payment processing network for non-payment data, and wherein the payment processing network generates extra-network communications to entities external to the payment processing network for making a payment to the payee on the financial transaction, wherein the processor hub performs rules-based workflow management processing on the adapted data for the financial transaction, wherein the rules-based workflow management processing comprises extracting and reformatting the adapted data into one or more formats defined by the external entities prior to directing the adapted data to the payment processing network, and wherein the processor hub receives responses to the requests for authorization from the issuer via the payment processing network and forwards the responses to the adapter layer for transmission to the payer;
   wherein the adapter layer is configured to receive the incoming data message from a graphical user interface browser application communicating over a public network and wherein the payer is associated with the account managed by the issuer; and
   wherein the processor hub is configured to provide an administrative interface through the graphical user interface browser application for setup and control and to provide access to the processor hub by participants of the financial transaction.

2. The system as in claim 1, wherein the payment processing network further generates authorization requests for payment on the financial transaction to a card account issuer.

3. The system as in claim 1, wherein the extra-network communications include external notification to an issuer/payer institution.

4. The system as in claim 1, wherein the extra-network communications include external notification to an acquirer/payee institution.

5. The system as in claim 1, wherein the financial transaction comprises a commercial push transaction.

6. The system as in claim 1, wherein the financial transaction comprises a bill payment.

7. The system as in claim 1, wherein the financial transaction comprises a purchase card transaction.

8. The system as in claim 1, wherein the financial transaction comprises an original credit transaction.

9. The system as in claim 1, wherein the payment processing network comprises a proprietary payment processing network and the adapted data provides payment instruction data for the proprietary payment processing network.

10. The system as in claim 1, wherein the requests from external payees for non-payment data comprise requests for database management operations.

11. The system as in claim 1, the system further comprising data stores containing data for processing by the processor hub, wherein the processor hub determines data for the transaction routing from data maintained by the payment processing network.

12. The system as in claim 1, wherein the one or more formats defined by the external entities are associated with automated transactions, clearing house transactions, wire transfers, and checks.

13. The system as in claim 1, wherein the non-payment data comprises reports.

14. The system as in claim 13, wherein the reports comprise settlements, daily positions, future estimates, and historical transactions for the external payees.

15. The system as in claim 1, wherein the adapter layer is configured to receive incoming data messages in a plurality of formats.

16. The system as in claim 15, wherein the plurality of formats comprises HTTP, HTTPS, EDI, FTP, SFTP, Swift, and VAN.

17. A method for processing data related to a financial transaction, the method comprising:
   producing adapted data in an adapter layer, the adapted data relating to the financial transaction from an incoming data message having a message format of a transaction system that is external to a payment processing network that processes transactions relating to an account managed by an issuer who utilizes the payment processing network, the incoming data message relating to any one of a financial transaction initiated by a payer, an authorization request, and a payee query request, such that the adapted data has a changed message format that is suitable for processing by the payment processing network;
   receiving the adapted data in a processor hub;
   determining, by the processor hub, transaction routing to direct the adapted data to the payment processing network and performing rules-based workflow management processing on the adapted data for the financial transaction, wherein the payment processing network:
      generates intra-network communications comprising requests for authorization by an issuer, requests for settlement and payment on the financial transaction to a transaction payee in response to authorizations, and responses to payee query requests from payees external to the payment processing network for non-payment data, and
      generates extra-network communications to entities external to the payment processing network for making payments to external payees, wherein the rule-based workflow management processing comprises extracting and reformatting the adapted data into one or more formats defined by the external entities prior to directing the adapted data to the payment processing network by the processor hub;
   receiving, at the processor hub, responses to the requests for authorization from the issuer via the payment processing network;
   forwarding, by the processor hub, the responses to the requests for authorization to the adapter layer for transmission to the payer;
   wherein the adapter layer is configured to receive the incoming data message from a graphical user interface browser application communicating over a public network and wherein the payer is associated with the account managed by the issuer; and
   wherein the processor hub is configured to provide an administrative interface through the graphical user interface browser application for setup and control and to provide access to the processor hub by participants of the financial transaction.

18. The method as in claim 17, further including generating an authorization request for payment on the financial transaction to a card account issuer.

19. The method as in claim 18, further including generating clearance and settlement operations for payment of the financial transaction on the card account.

20. The method as in claim 17, wherein generating the extra-network communications includes external notification to an issuer/payer institution.

21. The method as in claim 17, wherein generating the extra-network communications includes external notification to an acquirer/payee institution.

22. The method as in claim 17, wherein the financial transaction comprises a commercial push transaction.

23. The method as in claim 17, wherein the financial transaction comprises a bill payment.

24. The method as in claim 17, wherein the financial transaction comprises a purchase card transaction.

25. The method as in claim 17, wherein the financial transaction comprises an original credit transaction.

26. The method as in claim 17, wherein the payment processing network comprises a proprietary payment processing network and producing adapted data comprises producing adapted data that provides payment instruction data for the proprietary payment processing network.

27. The method as in claim 17, wherein the requests from external payees for non-payment data comprise requests for database management operations.

28. The method as in claim 17, wherein the system includes data stores containing data for processing by the processor hub, and wherein the processor hub determines data for the transaction routing from data maintained by the payment processing network.

\* \* \* \* \*